United States Patent
Kubota et al.

(10) Patent No.: US 6,456,782 B1
(45) Date of Patent: Sep. 24, 2002

(54) DATA PROCESSING DEVICE AND METHOD FOR THE SAME

(75) Inventors: Tatsuya Kubota; Youichi Matsumura, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/367,959

(22) PCT Filed: Dec. 25, 1998

(86) PCT No.: PCT/JP98/05973

§ 371 (c)(1),
(2), (4) Date: Aug. 26, 1999

(87) PCT Pub. No.: WO99/34561

PCT Pub. Date: Jul. 8, 1999

(30) Foreign Application Priority Data

Dec. 27, 1997 (JP) .............................. 9-367564

(51) Int. Cl.$^7$ ................................ H04N 5/52
(52) U.S. Cl. .................... 386/98; 375/240.26; 370/394; 370/517
(58) Field of Search ............................. 386/20, 68, 33, 386/81–82, 84, 95, 98, 111–112; 348/423.1; 375/240.26, 240.28; 370/394, 389, 468, 473, 474, 516–517

(56) References Cited

U.S. PATENT DOCUMENTS

| | | | |
|---|---|---|---|
| 5,561,791 A | * 10/1996 | Mendelson et al. | ......... 370/468 |
| 5,835,668 A | 11/1998 | Yanagihara | |
| 5,838,678 A | * 11/1998 | Davis et al. | ................. 370/389 |
| 5,845,042 A | 12/1998 | Yanagihara | |
| 5,845,043 A | 12/1998 | Yanagihara | |
| 5,850,501 A | * 12/1998 | Yanagihara | ................. 386/112 |
| 5,859,949 A | 1/1999 | Yanagihara | |
| 5,966,387 A | * 10/1999 | Cloutier | ..................... 370/516 |

FOREIGN PATENT DOCUMENTS

| | | |
|---|---|---|
| CN | 1131369 A | 9/1996 |
| CN | 1132445 A | 10/1996 |
| EP | 0 712 123 A2 | 5/1996 |
| JP | 8-195723 | 7/1996 |
| JP | 9-321727 | 12/1997 |
| JP | 1051496 | 2/1998 |
| TW | 276334 | 5/1996 |
| TW | 283817 | 8/1996 |

OTHER PUBLICATIONS

Brazilian Abstract No. PI 9509186–4 dated Nov. 14, 1995.

* cited by examiner

*Primary Examiner*—Thai Tran
*Assistant Examiner*—Christopher Onuaku
(74) *Attorney, Agent, or Firm*—Frommer Lawrence & Haug LLP; William S. Frommer

(57) ABSTRACT

Even the case where the transmission rate for packets is varied in forming a sequence of packets from the packets, time information previously added to each packet is corrected based on absolute time information added to each of the packets forming the sequence of packets, thereby making it possible to realize a data processing apparatus and method capable of significantly improving the transmission efficiency for packetized data.

12 Claims, 12 Drawing Sheets

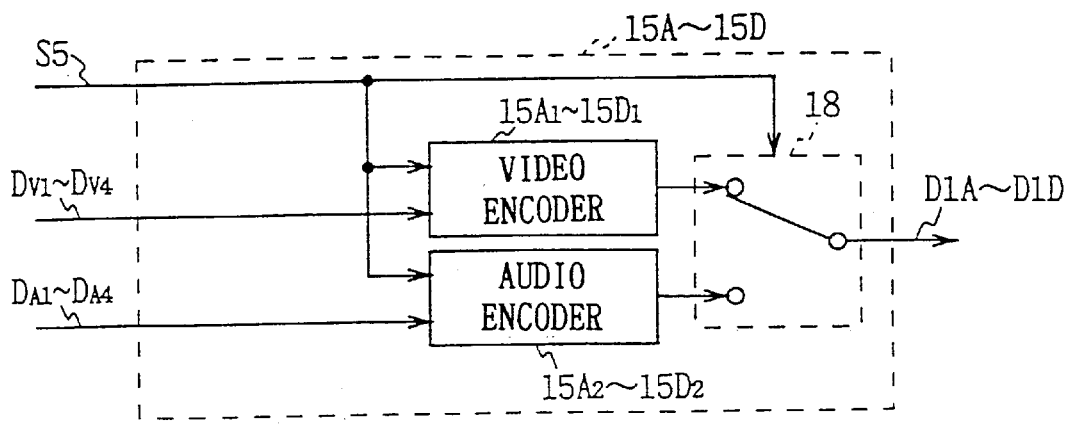
FIG. 3
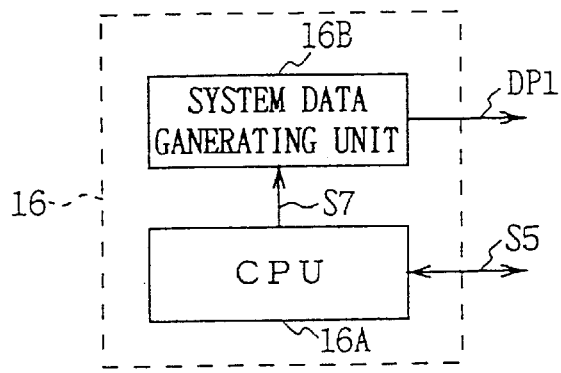
FIG. 4
| PID VALUE | EXPLANATION |
|---|---|
| 0x0000 | PAT |
| 0x0001 | CAT |
| 0x0002~0x000F | Reserved |
| 0x0010 | NIT,ST |
| 0x0011 | SDT,BAT,ST |
| 0x0012 | EIT,ST |
| 0x0013 | RST,ST |
| 0x0014 | TDT |
| 0x0015~0x001F | Reserved |
| 0x0020~0x1FFE | STREAM SUCH AS PMT,VIDEO,AUDIO |
| 0x1FFF | Null Packet |
FIG. 5

| KIND OF CHANNELS | PROGRAM NUMBER BEFORE CORRECTION | PROGRAM NUMBER AFTER CORRECTION |
|---|---|---|
| CHANNEL ChA | 00x0001 | 00x0005 |
| CHANNEL ChB | 00x0002 | 00x0006 |
| CHANNEL Ch1 | 00x0001 | 00x0001 |
| CHANNEL Ch2 | 00x0002 | 00x0002 |
| CHANNEL Ch3 | 00x0003 | 00x0003 |
| CHANNEL Ch4 | 00x0004 | 00x0004 |

FIG. 15

| KIND OF CHANNELS | ELEMENT | VALUE BEFORE PID CORRECTION | VALUE AFTER PID CORRECTION |
|---|---|---|---|
| CHANNEL ChA | Video | 00x0100 | 00x0108 |
| | Audio | 00x0101 | 00x0109 |
| CHANNEL ChB | Video | 00x0102 | 00x010A |
| | Audio | 00x0103 | 00x010B |
| CHANNEL Ch1 | Video | 00x0100 | 00x0100 |
| | Audio | 00x0101 | 00x0101 |
| CHANNEL Ch2 | Video | 00x0102 | 00x0102 |
| | Audio | 00x0103 | 00x0103 |
| CHANNEL Ch3 | Video | 00x0104 | 00x0104 |
| | Audio | 00x0105 | 00x0105 |
| CHANNEL Ch4 | Video | 00x0106 | 00x0106 |
| | Audio | 00x0107 | 00x0107 |

FIG. 16

DATA PROCESSING DEVICE AND METHOD FOR THE SAME

TECHNICAL FIELD

The present invention relates a data processing apparatus and method and is suitably applied to a transmitter of a digital video broadcast (DVB) system, for example.

BACKGROUND ART

Heretofore, there is a MPEG2 (Moving Picture Experts Group Phase 2) as a method of compression-encoding video data and audio data. This MPEG2 scheme is standardized (for example, recommendation, H.222.0) by an association such as ITU-T (International Telecommunication Union-Telecommunication Standardization Sector), to compression-encode, multiplex, store, and transmit video data and audio data.

In actual, in this MPEG2 scheme, a data form referred to a program stream (PS) and a data form referred to a transport stream (TS) are standardized as a data form for multiplexing compression-encoded video data and compression-encoded audio data. In this connection, the PS data form is applied to the case of storing multiplexed video data and audio data in a predetermined digital storing medium, and the TS data form is applied to the case of transmitting multiplexed video data and audio data.

Here, for example, the TS data form is so standardized that compression-encoded video data and audio data are converted into packets (hereinafter this is referred to TS (transport stream) packets) every predetermined unit (for example, every 188-byte data), and each of the resultant TS packets is subjected to time division multiplexing to form a TS packet stream (that is, a transport stream).

Note that, as shown in FIG. 17, the TS packet 1 is composed of a header part and a data part, in which the header part stores a synchronization byte, a packet identification (hereinafter, this is referred to as a PID (packet identification)) and other kinds of packet control data and the data part stores compression-encoded video data or audio data. In this connection, the synchronization byte is data showing the beginning of the TS packet 1, and the PID is data showing the content of information stored in the TS packet 1.

However, in recent years, a digital video broadcast system has been considered to compression-encode and multiplex video data and audio data with the MPEG2 scheme described above and then broadcast using a ground wave, a satellite wave, a cable, or the like. Such digital video broadcast system has been considered to be capable of broadcasting a plurality of television programs with one circuit by converting compression-encoded video data and audio data into TS packets and multiplexing them, as described above.

In actual, in a transmitter, for example, a transport stream is formed by forming TS packets at different timings with each encoder, and is supplied to a multiplexer. Thereby the multiplexer sequentially reads a plurality of TS packets included in the transport stream in an arrival order without overlap and moreover transmits them in the same order to perform multiplexing processing.

That is, normally, the multiplexer is composed of an input unit of being supplied with a transport stream from each encoder and a multiplexing unit for sequentially reading each transport stream from the input unit in a unit of TS packet included in the transport stream. For example, as shown in FIG. 18, the first TS packet corresponding to a television program for the first channel CH1 is supplied so as to arrive at the input unit at timing of time "n" when the TS packet is formed (FIG. 18A), and the second TS packet corresponding to a television program for the second channel CH2 is supplied so as to arrive at the input unit at timing of time "n+c" when the second TS packet is formed, with keeping a packet interval Sets (FIG. 18B).

Therefore, in the transmitter, the order in which the TS packet arrives at the multiplexing unit is the same as the order of TS packets included in the transport stream TS1 formed by performing multiplexing with the multiplexing unit. In this connection, each of the TS packets included in the transport stream TS formed in the multiplexing unit delays by a processing time d required to the multiplexing processing of the multiplexing unit (FIG. 18C).

In this way, the digital video broadcast system has been considered, in which TS packets corresponding to a desired channel out of the TS packets included in the transport stream TS1 received as a transmission signal from a receiver are sequentially decoded in the receiving order, thereby making it possible to accurately reproduce video data and audio data corresponding to the TS packets.

However, in each encoder of the aforementioned digital video broadcast system, the processing time required to encoding processing and packetizing processing is varied depending on the amount of supplied video data and the amount of supplied audio data, and it takes a long time after the multiplexing unit reads a TS packet which arrives first until a TS packet which arrives next is supplied to the multiplexing unit. As a result, a delay time required to the multiplexing processing may not be fixed in the TS packets.

That is, in the multiplexer, such a case may occur that, as shown in FIG. 19, while the multiplexing unit reads the first TS packet $P_1$ corresponding to the first channel CH1 which arrives at the input unit first (FIG. 19A), the second TS packet P2 corresponding to the second channel CH2 to be read next does not arrive yet (FIG. 19B), and the second TS packet $P_2$ arrives at "c" time after finishing to read of the first TS packet $P_1$ (FIG. 19C).

Therefore, a gap g is generated between the first TS packet $P_1$ and the second TS packet $P_2$ out of the TS packets included in the transport stream TS2 formed in the multiplexing unit (FIG. 19). This case has been considered to cause a problem that, if the receiver decodes and reproduces the first TS packet $P_1$ and the second TS packet $P_2$, a picture and voice are interrupted by the gap g generated between the first TS packet $P_1$ and the second TS packet $P_2$.

Here, assuming that the number of channels to be input to the multiplexer is n and channels are represented as the channel 1, channel 2, channel 3, ..., channel n, a delay time due to the multiplexing for the channel 1 to the channel n will be explained. In this case, it is assumed that input rates for the channel 1 to channel n are R1, R2, R3, ..., Rn [bits/sec] respectively, and that the number of bits buffered in memories (FIFO) for the channel 1 to the channel n are V1, V2, V3, ..., Vn [bits] respectively. In addition, it is assumed that an output rate of outputting each multiplexed TS packet from the multiplexer is R [bits/sec]. Firstly, with respect to each TS packet to be input to the multiplexer, each encoder of a former stage performs such statistics multiplexing processing that the sum (R1+R2+R3+ . . . +Rn [bit/sec]) of input rates for the channel 1 to the channel n is equal to the output rate R [bits/sec]. In the statistics multiplexing processing, the input rates for the channel 1 to the channel n are varied. In this case, the sum (R1+R2+

R3+ . . . +Rn [bit/sec]) of the input rates is obtained by the following equation (1) to be equal to the output rate R [bits/sec];

$$R = R1 + R2 + R3 + \ldots + Rn \text{ [bits/sec]} \quad (1)$$

Since the transmission capacity for output is generally decided in advance, it can be assumed that the output rate R [bits/sec]) is fixed. Assuming that the total number of bits buffered in the memories for the channel 1 to the channel n is V [bits], the total V [bits] is obtained by the following equation (2);

$$V = V1 + V2 + V3 + \ldots + Vn \text{ [bits]} \quad (2)$$

In this case, since the sum of the input rates (R1+R2+R3+ . . . +Rn [bits/sec]) is the output rate R [bits/sec], the total number V [bits] of bits is always fixed.

Here, the delay time for the first channel 1 will be calculated. In the case where the input rate is R1 [bits/sec] and the number of buffered bits is V1 [bits], the delay time D1 is as follows;

$$D1 = \frac{V1}{R1} \text{ [sec]} \quad (3)$$

Further, if the TS packets are read out from the memories (FIFO) in the input order and are multiplexed, the number of bits buffered in each of the channel 1 to the channel n is the ratio of the rates, so that the number of bits V1 [bits] buffered in the memory (FIFO) for the channel 1 is as follows;

$$V1 = \frac{R1 \times V}{R1 + R2 + R3 + \ldots + Rn} \text{ [bits]} \quad (4)$$

Therefore, substituting the equation (1) for the equation (4) is as follows;

$$V1 = \frac{R1 \times V}{R} \text{ [bits]} \quad (5)$$

Further, the delay time D1 in the case of performing multiplexing in the input order is obtained by the following equation (6) by taking V1 away from the equation (3) and the equation (5);

$$D1 = \frac{V}{R} \text{ [sec]} \quad (6)$$

Here, the output rate R [bits/sec] and the total number V [bits] of bits buffered in the memories (FIFO) for the channel 1 to the channel n are fixed as mentioned above, so that the delay time D1 in the channel 1 is fixed irrespective of the variation of the input rate R1.

In this connection, if multiplexing is performed in the order of larger number of bits buffered in the memories (FIFO), all channels have the equivalent number of bits therein. Therefore, the number of buffered bits V1 [bits] is obtained by the following equation, by dividing V into n;

$$V1 = \frac{V}{n} \text{ [bits]} \quad (7)$$

In this case, the delay time D1 when the buffered bits are multiplexed in the order of larger number is obtained by the following equation (8) by taking V1 [bits] away from the aforementioned equation (3) and equation (7).

$$D1 = \frac{V}{n \times R1} \text{ [sec]} \quad (8)$$

Therefore, the equation (8) means that the delay time D1 is varied according to the variation of the input rate R1 [bits/sec] because the total number of buffered bits V [bits/sec] and the number of channels n are fixed. Therefore, if the input rate R1 is sometimes varied as in the case of the statistics multiplexing, the delay time D1 of the channel are also varied accordingly.

Thus, in this case, a multiplexing algorithm method is desirable, in which a delay time required to perform the multiplexing processing in each of the channel 1 to the channel n is not varied even if the TS packets input to each channel are read out and multiplexed in the order of writing to the memory (FIFO). In the multiplexing algorithm method, it is possible to easily prevent the buffer memory in the latter stage of decoder (IRD) from overflow and underflow.

As a multiplexing processing method using such a multiplexing algorithm method, a method is considered in which a time stamp having a predetermined length is added to every TS packet in a stage prior to the multiplexing processing and the value of PCR (Program Clock Reference) previously stored in every TS packet is corrected based on the time stamp to keep the delay time of TS packets constant.

However, in a DVB-ASI (Asynchronous Serial Interface) standard in the digital video broadcast system, a signal obtained by serial-to-parallel converting a serial signal of 270 [MHz] is transmitted every 8 [bits] with 27 [MHz], and when each TS packet is multiplexed, intervals (hereinafter, these are referred to as stream intervals) between TS packets are standardized so as to be over 2 [byte].

Therefore, there is no problem in the case where the data length of the time stamp is shorter than the stream interval, however, the aforementioned multiplexing algorithm is very difficult to be applied in the case where the data length of the time stamp is longer than the stream interval.

Therefore, as a method of keeping the delay time of TS packets constant, other than such multiplexing algorithm method, a method has been proposed in which a timer is provided in every channel and time information based on the each timer is assigned to a corresponding TS packet in succession. However, according to this method, the structure of the whole multiplexer becomes complicated because a timer is provided in every channel, so that it is not enough to have practical use.

DISCLOSURE OF INVENTION

The present invention has been made in view of the aforesaid conventional problems, and is intended to a data processing apparatus and method capable of further improving transmission efficiency for packetized data.

To solve such problems, the present invention provides a data processing apparatus and method that adds redundant data to supplied data every predetermined unit to packetize it, and outputs the packetized data in the predetermined unit as a sequence of packets. After eliminating the redundant data from each packet by a data eliminating means, absolute time information is added to each packet from which the redundant data is eliminated, by a time information adding means. Then, after forming a sequence of packets based on sequentially-supplied packets by a packet forming means, each of the time information previously added to the corresponding packets is corrected based on the absolute time information added to each packet. And, after eliminating the absolute information from each packet having the corrected time information by a time information eliminating means, the redundant data is added to each packet from which the absolute time information is eliminated, by a data adding means.

As a result, even the case where the transmission rate of packets is varied at the time of forming a sequence of packets from the packets, the time information previously added to each packet can be corrected based on the absolute time information previously added to each of the packets forming the sequence of packets.

Thus, a data processing apparatus and method capable of further improving the transmission efficiency for packetized data can be realized.

BRIEF DESCRIPTION OF DRAWINGS

FIG. 3 is a block diagram showing the constitution of an encoder shown in FIG. 2.

FIG. 4 is a block diagram showing the constitution of a controller unit shown in FIG. 2.

FIG. 5 is a list showing the formation of PSI.

FIG. 15 is a chart explaining the correction of each program number on the PAT.

FIG. 16 is a chart explaining the correction of PID.

BEST MODE FOR CARRYING OUT THE INVENTION

Figure 1:
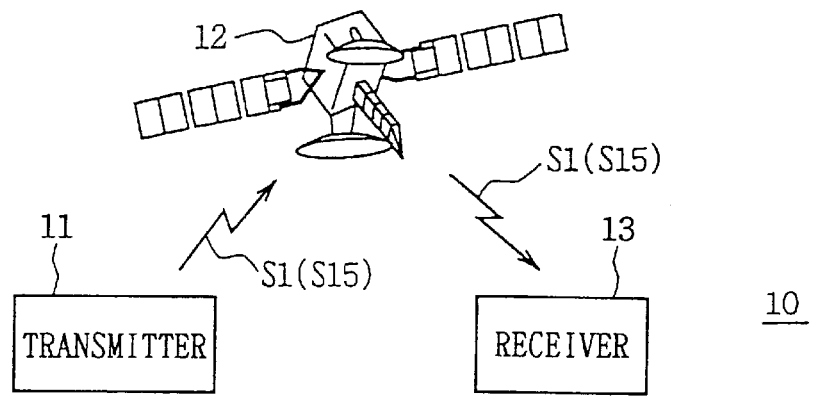
FIG. 1 is a schematic diagram showing the constitution of a digital video broadcast system according to the present invention.

An embodiment of the present invention will hereinafter be described with reference to the drawings.
(1) Structure of Digital Video Broadcast System According to the present invention In FIG. 1, numeral 10 shows a digital video broadcast system to which the present invention is applied, as a whole. Video data, audio data and the like for plural programs are multiplexed in a transmitter 11, the obtained digital broadcast signal S1 is transmitted to a receiver 13 via a broadcasting satellite 12. Meanwhile, TS packets of video data, audio data and the like for a desired program are extracted from the received digital broadcast signal S1 in the receiver 13, a picture is displayed or a sound is given based the video data and audio data stored in these TS packets.

In this MPEG2 system, a format is standardized as follows so as that program information for multiple channels can be transmitted by time-division-multiplexing numbers of separate encoded streams with TS packets each having the comparatively short transmission unit. That is, a header part of the TS packet has content identification information on its packet as program specific information PSI. And in the receiver that receives the digital broadcast signal S1 performs decoding by separating and extracting the packets required to reproduction using the PSI.

Figure 2:
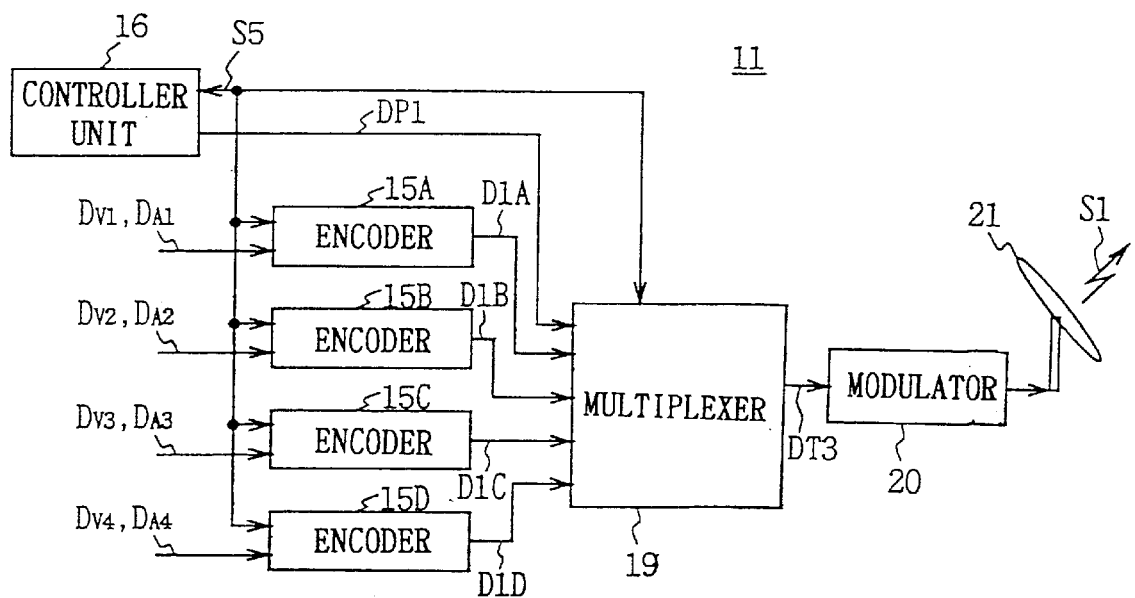
FIG. 2 is a block diagram showing the constitution of a transmitter according to the first embodiment.

(2) First Embodiment
(2-1) Structure of Transmitter According to First Embodiment In actual, in the digital video broadcast system 10, the transmitter 11 is provided with encoder 15A to 15D equivalent to the number of programs as shown in FIG. 2. The encoders 15A to 15D, when supplied with video data DV1 to DV4 and audio data DA1 to DA4 for respectively corresponding programs, execute compression-encoding, PS packetizing, and so on, based on a control signal S5 transmitted from the controller unit 16.

Therefore, the transmitter 11 multiplexes each TS packet D1A to D1D with the multiplexer 19 to form a single transport stream DT3 and transmits it to a modulator 20 and then, modulates the transport stream DT3 in a predetermined method (for example, QPSK (Quadrature Phase Shift Keying), QAM (Quadrature Amplitude Modulation), OFDM (Orthogonal Frequency Division Multiplex), or the like) with the modulator 20, and thus obtained transmission signal S1 is transmitted toward the broadcasting satellite 12 (FIG. 1) via an antenna 21. Thus, the transmitter 11 can broadcast television programs for plural channels via the broadcasting satellite 12 at the same time.

By the way, in this case, each encoder 15A to 15D has the video encoder $15A_1$ to $15D_1$ and the audio encoder $15A_2$ to $15D_2$, as shown in FIG. 3. A switch 18 provided at their output terminals is alternatively switched based on the control signal S5 transmitted from the controller unit every predetermined period of time.

Thus, the video encoder $15A_1$ to $15D_1$ and the audio encoder $15A_2$ to $15D_2$, when supplied with the video data $D_{V1}$ to $D_{V4}$ and audio data $D_{A1}$ to $D_{A4}$, sequentially convert the compression-encoded video data and the compression-encoded audio data into TS packets every predetermined block based on the control signal S5 transmitted from the controller unit 16, and then form the TS packets D1A to D1D by performing the time division multiplexing via the switch 18, and supply it to the multiplexer 19.

Here, as shown in FIG. 4, the controller unit 16 is composed of a CPU 16A and a system data generator 16B, in which the aforementioned control signal S5 is output from the CPU 16A. Further, the CPU 16A controls all the PID and the like, which are assigned to the transport streams corresponding to respective channels. When the CPU 16A transmits a control information signal S7 to the system data generator 16B, the system data generator 16B generates the program specific information PSI showing the value of PID designated by the control information signal S7 and transmits it to the multiplexer 19 as PSI data DP1.

In this connection, in the MPEG2 system format, the program specific information PSI is transmitted by using a packet having a specific identification code, information such as "what program is to be selected from plural programs" and "what packet is to be taken in and how decoded" is designated by the four tables, that is, a program association table PAT, a program map table PMT, a conditional access table CAT, and a network information table NIT. The program association table PAT shows the packet identification PID representing packets of the program map table PMT for transmitting information on packets forming the program for each program.

Further, the program map table PMT shows the packet identifications PID of packets for transmitting a stream for pictures, sounds, additional data, and the like forming the program, for each program. Furthermore, the conditional access table CAT shows the packet identifications PID of packets for transmitting code decipher information for deciphering a scramble in a pay program. Furthermore, the network information table NIT includes physical information on transmission paths, that is, information on orbits, waves, frequency of each transponder (satellite relay unit) with respect to the satellite, and information for identifying channels multiplexed by each transponder.

In addition, in the digital video broadcast system, a BAT (Bouquet Association Table), an SDT (Service Description Table), an EIT (Event Information Table), a TDT (Time and Date Table), an RST (Running Status Table) and an ST (Stuffing Table) are assigned to the network information table NIT as SI (service information) including various kinds of service information. Note that, FIG. 5 shows a value of each PID in the program specific information PSI.

Figure 6:
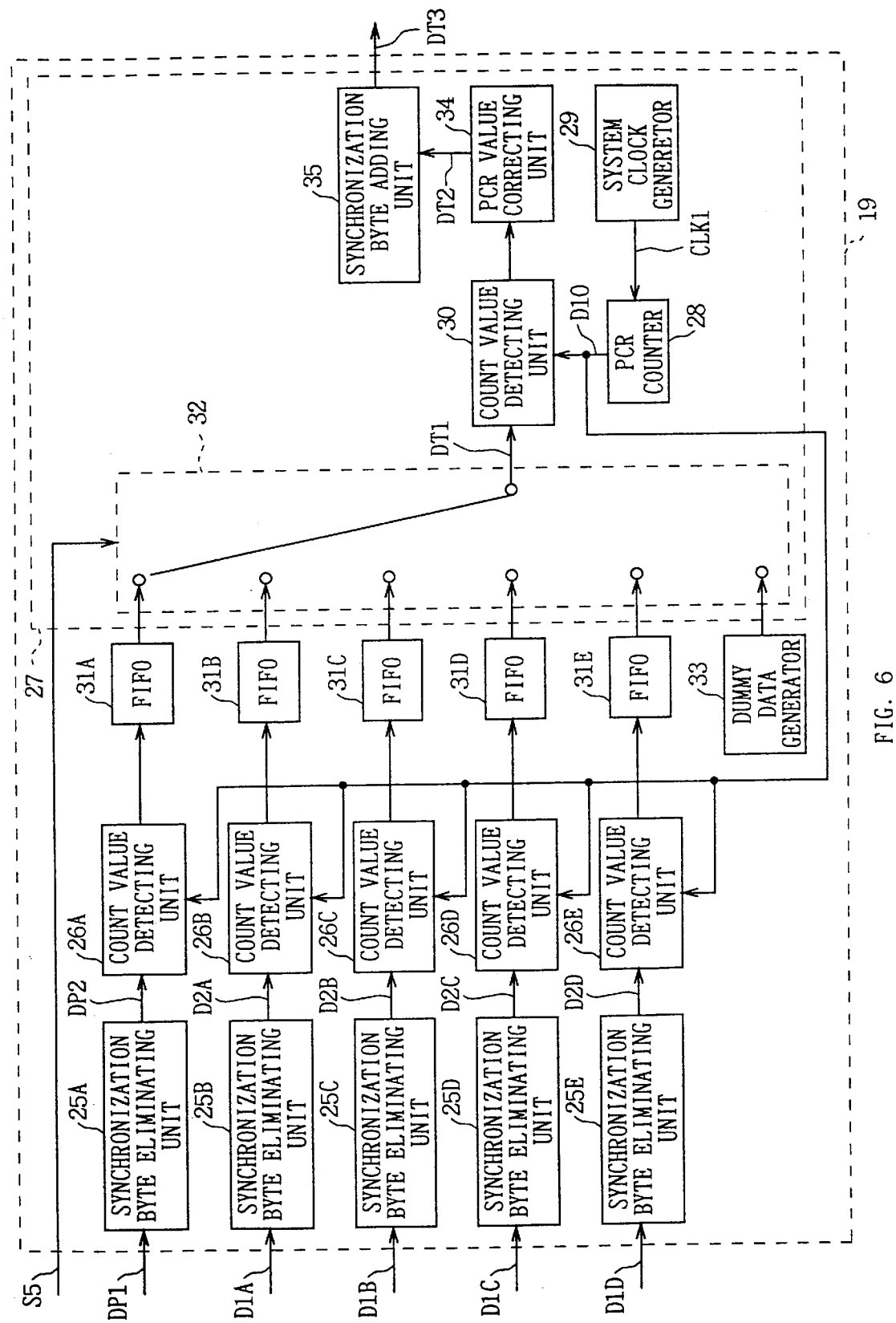
FIG. 6 is a block diagram showing the constitution of the multiplexer according to the first embodiment.

By the way, as shown in FIG. 6, in the case where the multiplexer 19 multiplexes the PSI data DP1 and TS packets D1A to D1D supplied from the controller unit 16 and encoders 15A to 15D respectively, the PSI data DP1 and the TS packets D1A to D1D are supplied to respectively corresponding synchronization byte eliminating units 25A to 25E.

Figure 17:
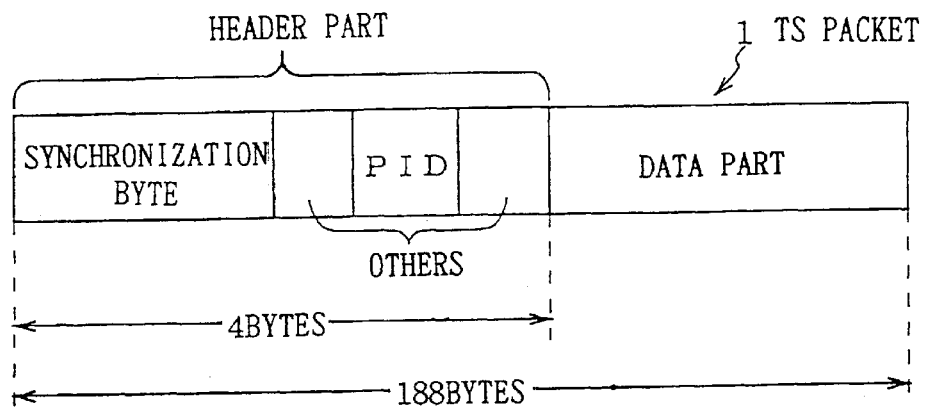
FIG. 17 is a schematic diagram showing the constitution of TS packet.

The synchronization byte eliminating units 25A to 25E have same constitution, in which the synchronization byte of 1 [byte] in the header part is eliminated from each of the supplied PSI data DP1 and TS packets D1A to D1D and then, the PSI data DP2 and TS packets D2A to D2D are supplied to respectively corresponding count value detecting units 26A to 26E. Specifically, in FIG. 7, when the aforementioned TS packet 1 shown in FIG. 17 passes through the synchronization byte eliminating unit 25A to 25D, the synchronization byte (47h) of 1 [byte] in the TS packet 1 is eliminated and a TS packet 1A of 187 [byte] is formed.

Here, a PCR counter 28 provided in a multiplexing unit 27 of the multiplexer 19, receives an operation clock CLK1 of 27 [MHz] from the system clock generator 29, and sequentially counts in synchronization with this, and supplies the count value to the count value detecting units 26A to 26E as count value data D10.

And, the count value detecting units 26A to 26E, receiving the PSI data DP2 and the TS packets D2A to D2D respectively, sequentially identify the tails of the PSI data DP2 and the TS packets D2A to D2D, and detect the count value of the arrival time of the tail from the count value data D10 transmitted from the PCR counter 28. Then, the count value is added to each tail as the first time stamp (start time of multiplexing).

In this connection, the number of bits necessary as the time stamp is 3 [byte] (that is, 24 [bits]). Hereinafter, the reason will be explained. In actual, in order that the multiplexing unit 27 may perform the multiplexing processing in the order of inputting TS packets and accurately execute the PCR correction described later, time required to perform the multiplexing processing from the input time until PCR correction time with respect to each TS packet may be shorter than a count cycle of the PCR counter 28.

At this time, the multiplexing unit 27 converts the time required to the multiplexing processing into the number of buffered streams. At first, a clock rate for the transport stream output by the multiplexing unit 27 will be considered.

Firstly, the case where the time stamp (PCR) is set to 3 [byte] (that is, 24 [bits]) will be explained. In the case where a modulator (hereinafter, this is referred to as a modulator for business) made by, for example, Com Stream (company name) is connected to the output side of the multiplexing unit 27, the clock rate $CK_{OUT1}$ of the transport stream to be output from the multiplexing unit 27 is expressed by the following equation (9);

$$CK_{OUT1}=3.9555 \text{ [MHz]} \tag{9}$$

In case where a modulator based on the DVB-ASI standard is connected, in place of that modulator, the clock rate $CK_{OUT2}$ of the transport stream to be output from the multiplexing unit is expressed by the following equation (10);

$$CK_{OUT2}=27 \text{ [MHz]} \tag{10}$$

Next, the count cycle of the PCR counter 28 is converted into the number of clocks $P_{CLOCK1}$ of 27 [MHz]. In this case, in the MPEG2 scheme, the PCR is composed of PCR-Extension and PCR-Base and the PCR-Extension comprising lower-rank bits is 27 [MHz], and the PCR-Base comprising higher-rank bits is raised by one whenever counting is performed from 0 up to 299. Further, since it is so standardized that the PCR-Extension becomes 9 [bits], the PCR-Base becomes 15 [bits] which is obtained by subtracting the PCR-Extension of 9 [bits] from the PCR of 3 [byte] (24 [bits]). Thus, the number of clocks $P_{CLOCK1}$ is expressed by the following equation (11);

$$P_{CLOCK1}=215 \times 300=9830400 \text{[count]} \tag{11}$$

If a time for what the transport stream passes through the multiplexing unit 27 is not within the count cycle of the PCR counter 28, it is difficult to accuracy perform the PCR correction. This passing time is converted into the number of transport streams to be buffered in the multiplexing unit 27. That is, in the case where the aforementioned modulator for business is connected to the output side of the multiplexing unit 27, the number of streams $ST_{count1}$ is expressed by the following equation (12);

$$ST_{count1} = \frac{P_{CLOCK1}}{204} \times \frac{CK_{OUT}}{27} = 7059 \tag{12}$$

however, the length of a stream is set to 204 [byte].

In the case where the modulator based on the DVB-ASI standard is connected to the output side of the multiplexing unit 27, in place of that modulator, the number of streams $ST_{count2}$ is expressed by the following equation (13);

$$ST_{COUNT2} = \frac{P_{CLOCK2}}{204} \times \frac{CK_{OUT2}}{27} = 48188 \quad (13)$$

Thus, from the equation (12), in the case of connecting the aforementioned modulator for business, the maximum number of streams that can be buffered in the multiplexing unit 27 is 7059. Further, the number of streams that can be buffered in the multiplexing unit 27 is found to depend on the output rate by the equation (12) and the equation (13).

Further, in the case where the number of channels to be multiplexed by the multiplexing unit 27 is 21 channels, the number of streams which can be buffered per one channel is expressed by the following equation (14), by dividing the number of streams by the number of channels with respect to the equation (12);

$$S_{count1} = \frac{7059}{21} = 336 \quad (14)$$

On the other hand, the case where the PCR is set to 2 [byte] (that is, 16 [bits]) will be explained. Similarly to the aforementioned case, the count cycle of the PCR counter 28 is converted into the number of clocks $P_{CLOCK2}$ of 27 [MHz]. In this case, the PCR-Base becomes 7 [bits] by subtracting the PCR-Extension of 9 [bits] from the PCR of 2 [byte] (16 [bits]). Thus, the number of clocks $P_{CLOCK2}$ is expressed by the following equation (15);

$$P_{CLOCK2} = 27 \times 300 \approx 38400 [count] \quad (15)$$

Similarly to the aforementioned case, the time for passing through the multiplexing unit 27 is converted into the number of transport streams to be buffered. That is, in the case where the aforementioned modulator for business is connected to the output side of the multiplexing unit 27, the number of streams $ST_{COUNT3}$ is expressed by the following equation (16);

$$ST_{count3} = \frac{P_{CLOCK2}}{204} \times \frac{CK_{OUT1}}{27} = 27 \quad (16)$$

however, the length of a stream is set to 204 [byte].

In the case where the modulator based on the DVB-ASI standard is connected to the output side of the multiplexing unit 27, in place of that modulator, the number of streams $ST_{COUNT4}$ is expressed by the following equation (17);

$$ST_{count4} = \frac{P_{CLOCK2}}{204} \times \frac{CK_{OUT2}}{27} = 188 \quad (17)$$

Thus, from the equation (16), in the case of connecting the aforementioned modulator for business, the maximum number of streams that can be buffered in the multiplexing unit 27 is 27. In addition, the equation (16) and the equation (17) show that the number of streams which can be buffered in the multiplexing unit 27 depends on the output rate.

Further, in the case-where the number of channels to be multiplexed by the multiplexing unit 27 is, for example, 21 channels, the number of streams which can be buffered per one channel is expressed by the following equation (18), by dividing the number of streams by the number of channels with respect to the equation (16);

$$S_{count2} = \frac{27}{21} = 1 \quad (18)$$

The equation (18) shows that the multiplexing processing can not be constituted as a system considering the statistics multiplexing in which the rate is sometimes varied if the number of streams is one. Therefore, in the case of connecting the conventional modulator for business to the output side of the multiplexing unit 27, the equation (14) and the equation (18) show that the number of streams which can be buffered per one channel greatly depends on the number of bytes in PCR and that at least 3 [byte] is necessary. Therefore, the minimum required number of bits is found to be 3 [byte] as the time stamp (PCR).

Figure 7:
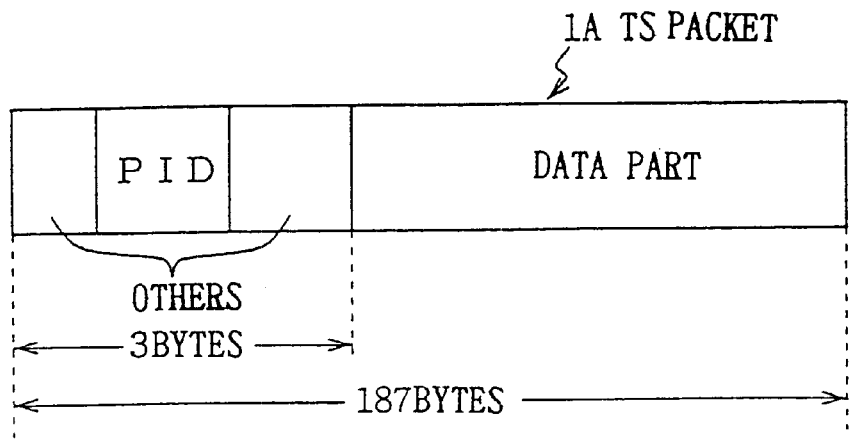
FIG. 7 is a schematic diagram showing the constitution of the TS packet.
Figure 8:
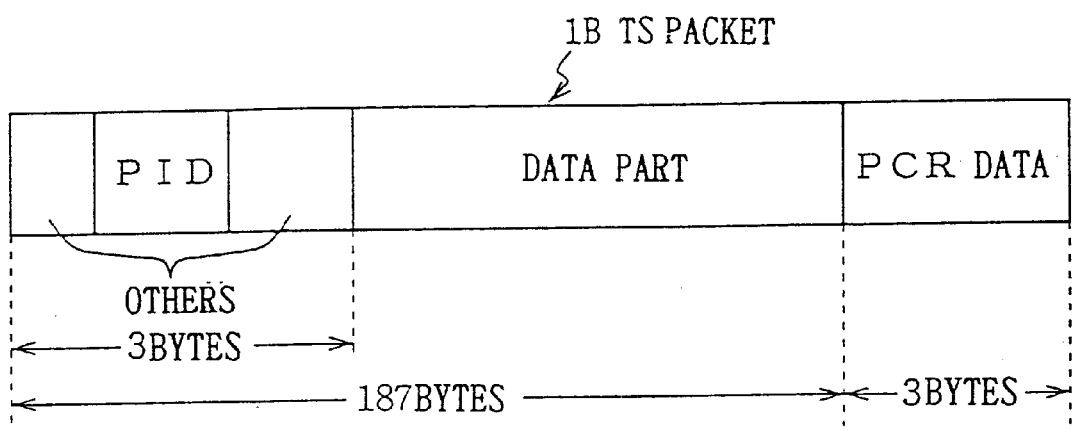
FIG. 8 is a schematic diagram showing the constitution of the TS packet.

Thus, each count value detecting unit 26A to 26E generates a TS packet 1B in which the PCR (first time stamp) data of 3 [byte] is added to the TS packet 1A of 187 [byte] shown in FIG. 7, as shown in FIG. 8.

Figure 9:
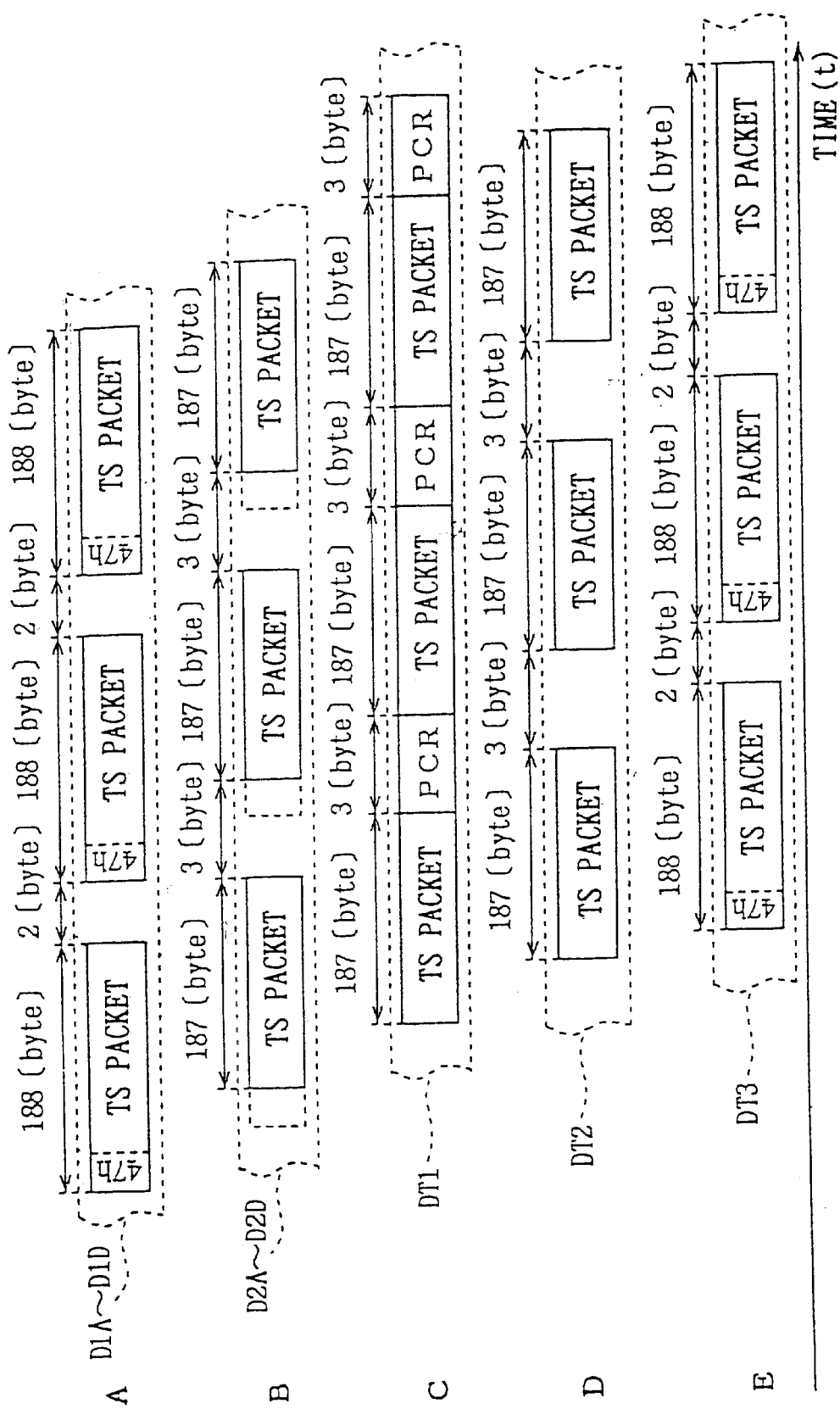
FIG. 9 is a timing chart explaining the processing of the transport stream.

In actual, in the DVB-ASI standard, when each TS packet is multiplexed, an interval (hereinafter, referred to as a stream interval) between TS packets is standardized to be 2 [byte] or more (FIG. 9A). Therefore, the aforementioned synchronization byte eliminating units 25A to 25E eliminate a redundant synchronization byte of 1 [byte] from the TS packets D1A to D1D respectively (FIG. 9B), thereby the PCR of 3 [byte] is utilized as the time stamp for each TS packet D2A to D2D.

The count detecting units 26A to 26E successively supply the PSI data DP2 having the first stamp added thereto and the TS packets D2A to D2D to the FIFO memories 31A to 31E respectively. The FIFO memories 31A to 31E successively store the input PSI data DP2 and the TS packets D2A to D2D in an arrival order.

The FIFO memories 31A to 31E are connected to the input terminal of the switch 32, and are selectively switched based on the control signal S5 output from the controller unit 16 (FIG. 2) so as to successively read out data in the storing order for each channel.

Thus, the multiplexing unit 27 reads out and multiplexes the PSI data DP2 and the TS packets D2A to D2D in the storing order from the plurality of FIFO memories 31A to 31E in order to form the transport stream DT1 (FIG. 9C).

Note that, a dummy data generator 33 is connected to the input terminal of the switch 32 so as to be connected when the FIFO memories 31A to 31E have no data. By transmitting a Null packet DN1 from the dummy data generator 33 to be multiplexed, lack of data in the aforementioned transport stream DT1 is prevented.

By the way, the multiplexing processing may cause change of the stream interval in the transport stream DT1. For this reason, in the receiver 13 (FIG. 1) in the MPEG2 system, synchronizing is performed using a PLL (Phase Locked Loop) so that the time when the transport stream DT1 arrives at the decoder (IRD) in the receiver 13 coincides with the time shown by the PCR value. Therefore, the multiplexing unit 27 needs to correct the PCR value previously added to each TS packet according to the change of the stream interval.

However, it is difficult to correct the PCR value by detecting only the change of the stream interval. Therefore, in the multiplexing unit 27, the delay time is calculated with reference to the first and second time stamps added as the arrival time before and after the multiplexing processing with respect to each of the TS packets forming the transport stream DT1. Thereby, the PCR value is corrected based on the calculation result. In this case, firstly the count value detecting unit 30 detects the first time stamp, which is added by each count value detecting unit 26A to 26E, from the supplied transport stream DT1 and moreover, detects the count value of the time when the first time stamp arrives, from the count value data D10 obtained by the PCR counter 28, as the second time stamp. After that, the count value detecting unit 30 supplies the count values shown by the first and second time stamps to the PCR value correcting unit 34.

The PCR value correcting unit 34 can obtain the processing time (delay time) $T_{MP}$ required to perform the multiplexing processing on the TS packets D2A to D2D, with the following equation (19) by using the count value (arrival time) $T_1$ shown by the first time stamp and the count value (arrival time) $T_2$ shown by the second time stamp;

$$T_{MP}=T_2-T_1 \tag{19}$$

In the multiplexing unit 27, a fixed delay (that is, system delay) due to the multiplexing processing occurs for each TS packet. However, for example, considering the case like the statistics multiplexing, that is, the case where the time of fixed delay is varied according to the change of input rate, the average time of the fixed delay with respect to each TS packet is assumed to be $T_d$ and is subtracted from the delay time $T_{MP}$, thereby a time difference of the fixed delay which occurs every TS packet is suppressed at a minimum.

Thus, in the PCR correcting unit 34, the input PCR value is assumed to be $PCR_{OLD}$, the $PCR_{new}$ after changing is corrected by only the delay $(T_{MP}-T_d)$ as shown by the following equation (20);

$$PCR_{new}=PCR_{old}+T_{MP}-T_d \tag{20}$$

Therefore, even the case the statistics multiplexing is performed, the variation of the number of buffered bits can be suppressed at a minimum.

Next, the PCR correcting unit 34 corrects the PCR value previously added to each of the TS packets forming the transport stream DT1 and then, eliminates the PCR from the transport stream DT1, and supplies this to a synchronization byte adding unit 35 as a transport stream DT2 (FIG. 9D).

The synchronization byte adding unit 35 successively adds the original synchronization bytes eliminated by the aforementioned synchronization byte eliminating units 25A to 25E, to the TS packets forming the transport stream DT2, to form a transport stream DT3 having the stream interval of 2 [byte] (FIG. 9E).

Thus, in the multiplexing unit 27 transmits the transport stream DT3 supplied from the synchronization byte adding unit 35 via a transmitter (not shown) of a next stage as the digital broadcast signal S1.

(2—2) Structure of Receiver According to First Embodiment

Figure 10:
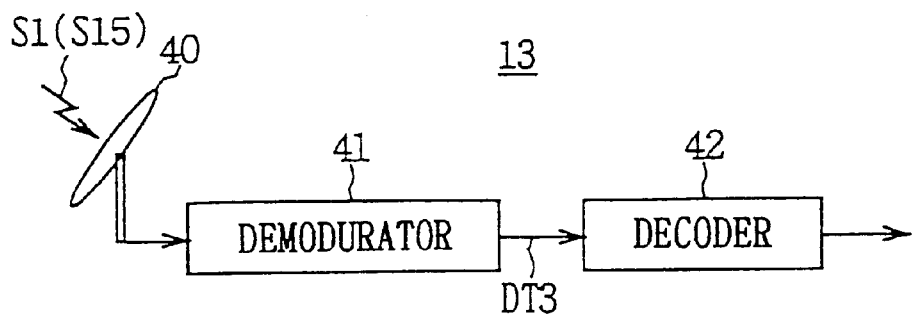
FIG. 10 is a block diagram showing the constitution of the receiver.
Figure 11:
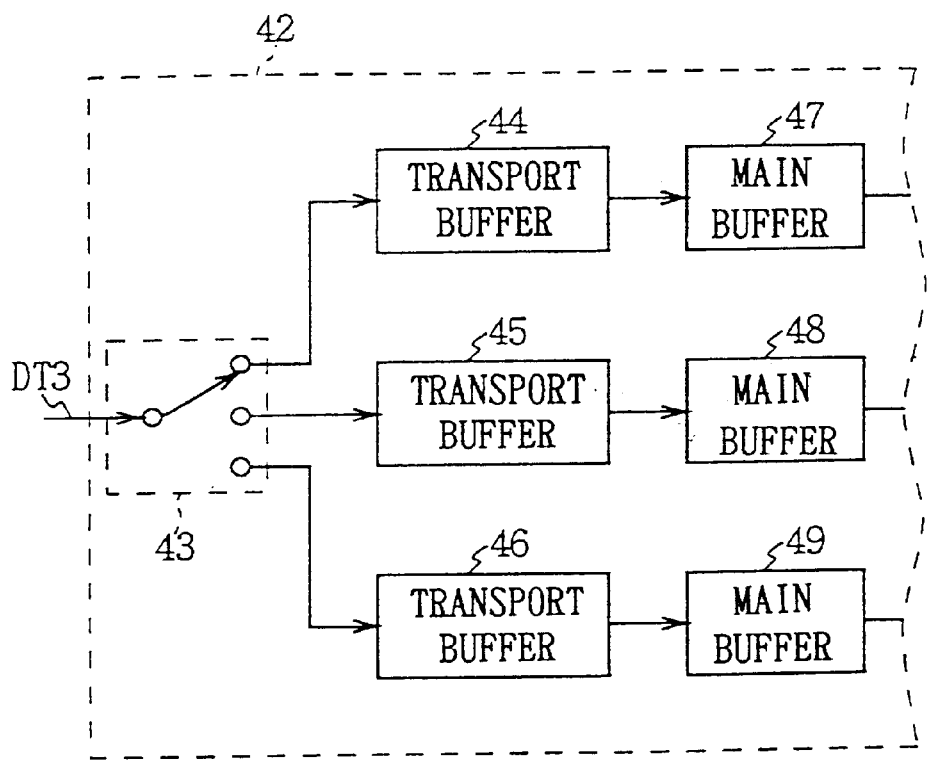
FIG. 11 is a block diagram showing the constitution of the buffer in the decoder shown in FIG. 10.

On the other hand, the receiver 13 in the digital video broadcast system 10 (FIG. 1) receives the digital broadcast signal S1 via an antenna 40, as shown in FIG. 10, and a demodulator 41 in the receiver 13 demodulates the digital broadcast signal S1 by a predetermined method to restore the transport stream DT3. Thus obtained transport stream DT3 is supplied to a decoder (IRD) 42, and any of program data corresponding a selected desired channel is decoded and output.

That is, the decoder 42 inputs the input transport stream DT3 in a switch 43. The switch 43 selectively switches transport buffers 44, 45, and 46 according to the PID value of each input TS packet, to divide the transport stream DT3 into TS packets each storing video data, audio data, or PSI. Each of divided TS packets is temporarily stored in the transport buffer 44, 45, or 46.

The transport buffer 44 temporarily stores the video data obtained by dividing the transport stream DT3 and then transmits it to a main buffer 47. Further, the transport stream 45 temporarily stores the audio data obtained by dividing the transport stream DT3 and then transmits it to a main buffer 48. Furthermore, the transport buffer 46 temporarily stores the PSI data obtained by dividing the transport stream DT3 and then transmits it to a main buffer 49.

In this way, the decider 42 temporarily stores the video data, audio data, and PSI data output from the transport buffers 44, 45, and 46, in the main buffers 47, 48, and 49 respectively, and then reads out and decodes these data.

In the decoding processing, a PLL circuit (not shown) is phase-synchronized based on the PCR of each TS packet corrected by the transmitter 11, to generate an operational clock, and data (video data, audio data and so on) is decoded by the operational clock. Therefore,,the decoder 42 can decode the video data and the audio data at operational timing synchronizing with the control signal S5 which is input to the encoders 15A to 15D of the transmitter 11 (FIG. 2).

Figure 12:
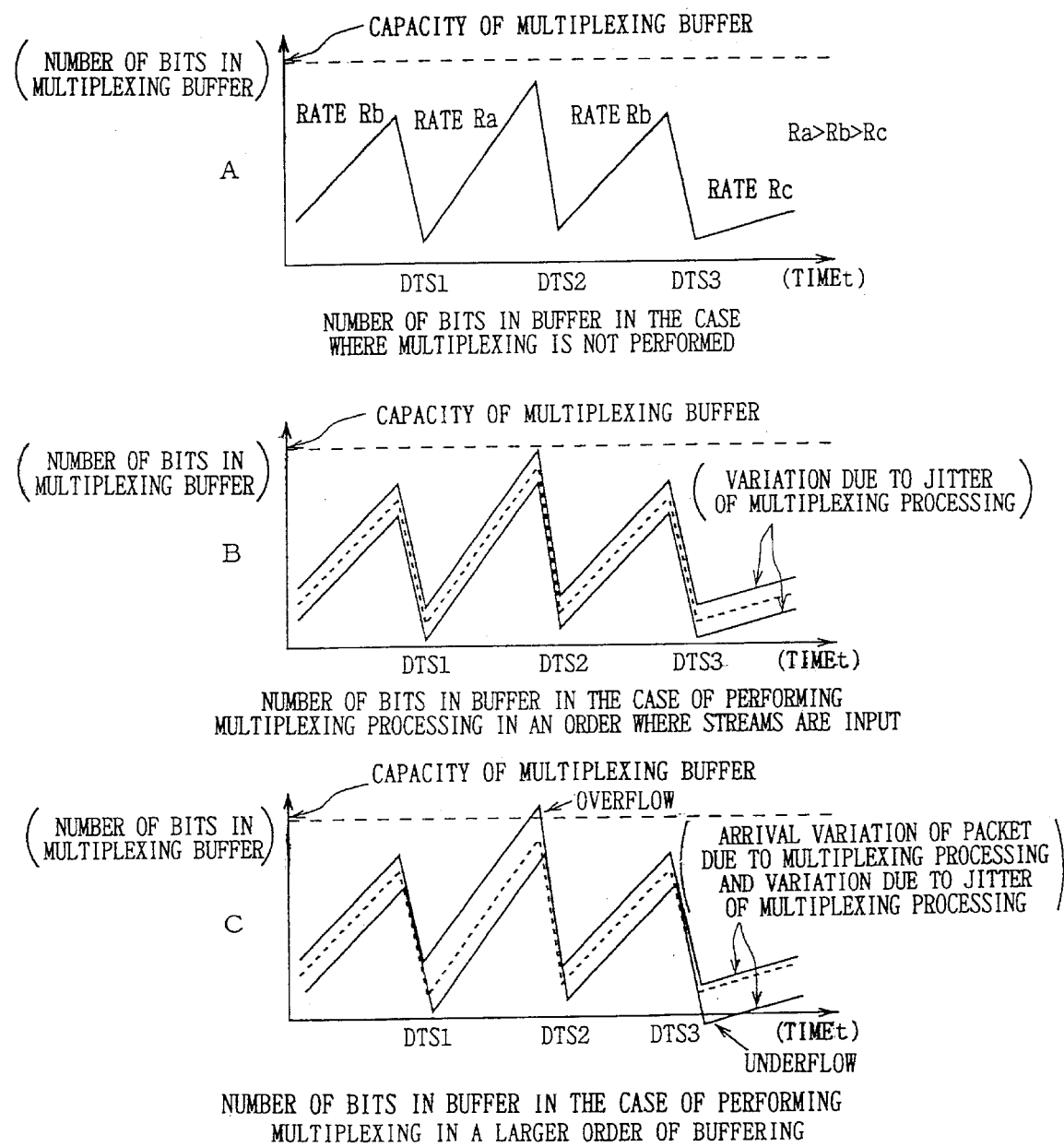
FIG. 12 is a characteristic curve diagram showing the change of the amount of data in the main buffer of the decoder.

Here, FIG. 12 shows the variation of the number of bits stored in the main buffer 47, 48, or 49 of the decoder 42. Data is read out from the main buffer 47, 48, or 49 according the decoding time represented by the DTS (Decoding Time Stamp) (DTS1, DTS2, DTS3) added to the TS packet by the transmitter 11, and is decoded.

In this case, the PCR added to a predetermined TS packet designates the time when data is input to the decoder 42 (that is, each main buffer 47, 48, or 49). If a difference between the PCR and the DTS is varied, the bits stored in the main buffer 47 (48, or 49) overflow or underflow as shown in FIG. 12C.

The variation of the difference between the PCR and the DTS occurs because the delay time due to the multiplexing processing of the transmitter 11 is varied for each channel. Therefore, in the multiplexer 19 according to this embodiment, as described in FIG. 6, the TS packets are read out and are multiplexed in an order of writing the TS packets in the FIFO memories 31A to 31E, thus the delay time due to the multiplexing processing for each channel are kept approximately constant.

As a result, as shown in FIG. 12B, the variation of the rate of data occupying the main buffer 47 (48 or 49) is significantly suppressed by performing writing and reading of the TS packets corresponding to the fixed delay time, with respect to the main buffer 47 (48 or 49). Thus occurrence of overflow and underflow can be prevented in advance. In this connection, FIG. 12A shows the variation of the rate of occupying data in the case of storing data that is not multiplexed, in the main buffer 47.

(2-3) Operation and Effect of First Embodiment

In the aforementioned configuration, the multiplexer 19 of the transmitter 11 eliminates the synchronization data of 1 [byte] from the header part of each of TS packets D1A to D1D output from the encoders 15A to 15D and then, transmits these TS packets D2A to D2D to the count value detecting units 26B to 26E.

The count value detecting units 26B to 26E add the PCR (first time stamp) of 3 [byte] synchronized with the count result by the PCR counter 28 to the respectively corresponding TS packets D2A to D2D, and then execute the multiplexing processing in the order of input to the multiplexing unit 27, to form the transport stream DT1.

Sequentially, the multiplexing unit 27 corrects the PCR value after the multiplexing processing, by using the first time stamp added before the multiplexing processing out of the transport stream DT1, and thereby the delay time due to the statistics multiplexing processing can be kept constant irrespective of the variation of the input rate for each channel. After that, the multiplexing unit 27 eliminates the PCR from each transport stream DT1 having the corrected PCR, and then sequentially adds the aforementioned original byte of 2 [byte] to form the transport stream DT3 having the stream interval of 2 [byte].

As a result, in the multiplexing unit 19 of the transmitter 11, even the case where the transmission rate for the TS packets at the time of the multiplexing processing is varied, the PCR value previously added to each TS packet multiplexed is corrected based on the first time stamp added to the TS packet.

According to the aforementioned configuration, in the multiplexer 19 of the transmitter 11, the first time stamp is added to each TS packet at a stage prior to the multiplexing processing in place of the synchronization byte, the PCR value previously added to each TS packet subjected to the multiplexing processing is corrected by using the first time stamp, and then the synchronization byte is added again in place of the first time stamp. Thereby, even the case where the transmission rate for the TS packet at the time of the multiplexing processing is varied, the PCR value previously added to each TS packet can be corrected based on the first time stamp added to each TS packet multiplexed, thus making it possible to realize the multiplexer 19 which significantly improves the transmission efficiency for packetized data.

Figure 13:
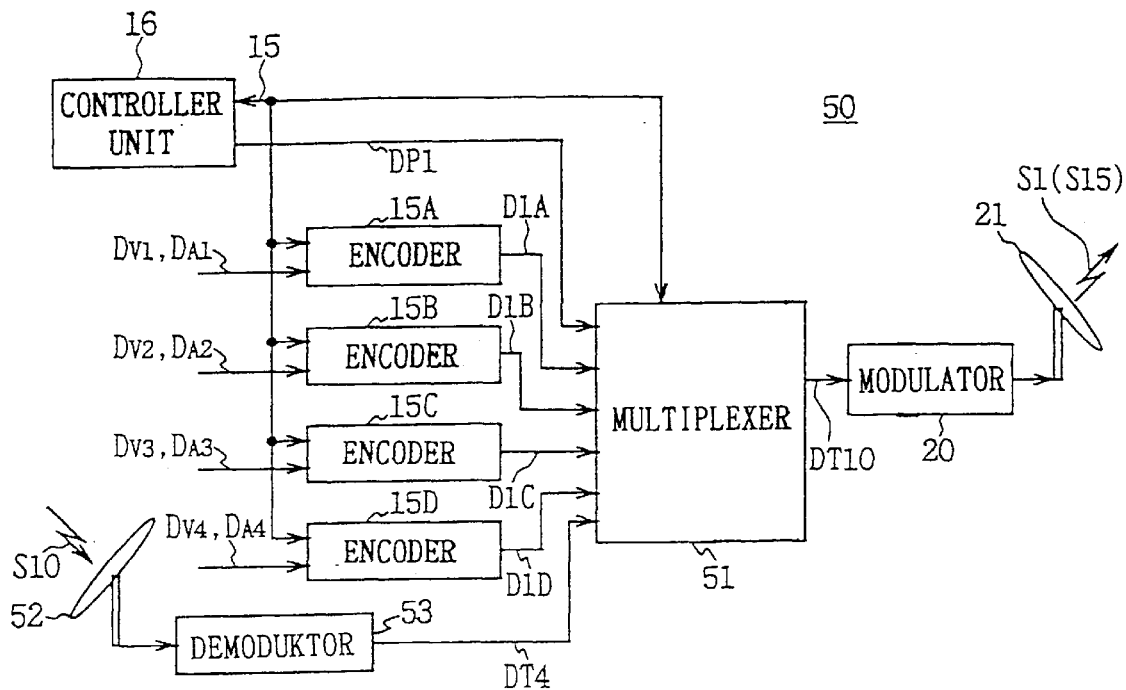
FIG. 13 is a block diagram showing the constitution of the transmitter according to the second embodiment.

(3) Second Embodiment (3-1) Structure of Transmitter According to the Second Embodiment In FIG. 13 in which the same reference numerals are applied to parts corresponding to FIG. 2, a transmitter 50 has the same structure as the transmitter 11 according to the first embodiment shown in FIG. 2 except that an antenna 52 and a demodulator 53 are connected to a multiplexer 51.

In this embodiment, a digital broadcast signal S10 formed of the transport stream DT4 which has already been multiplexed by another broadcast station is input to the demodulator 53 via the antenna 52, and is demodulated with a predetermined method by the demodulator 53, and then the restored transport stream DT4 is transmitted to the multiplexer 51.

Figure 14:
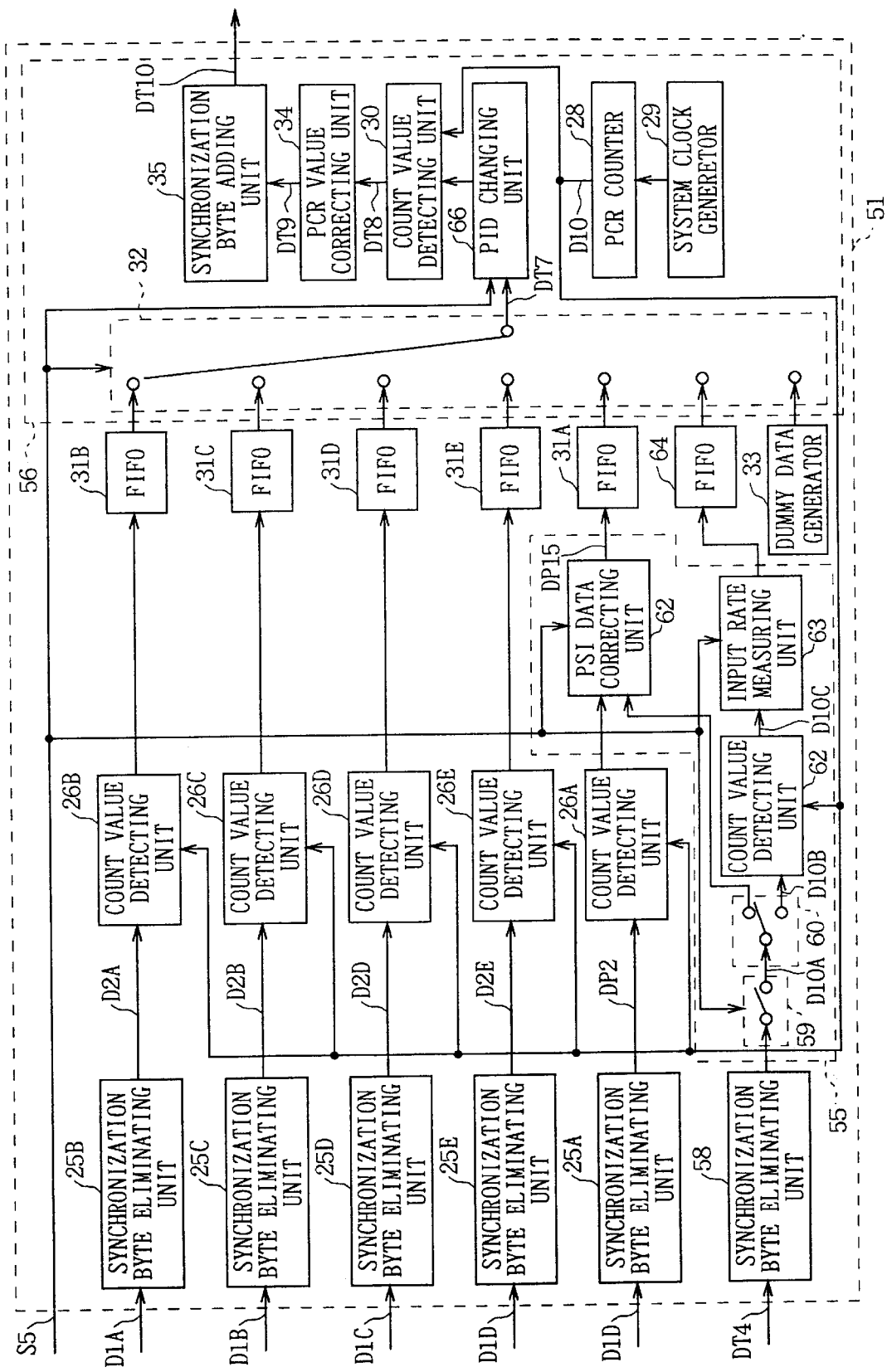
FIG. 14 is a block diagram showing the constitution of the multiplexer according to the second embodiment.
Figure 18:
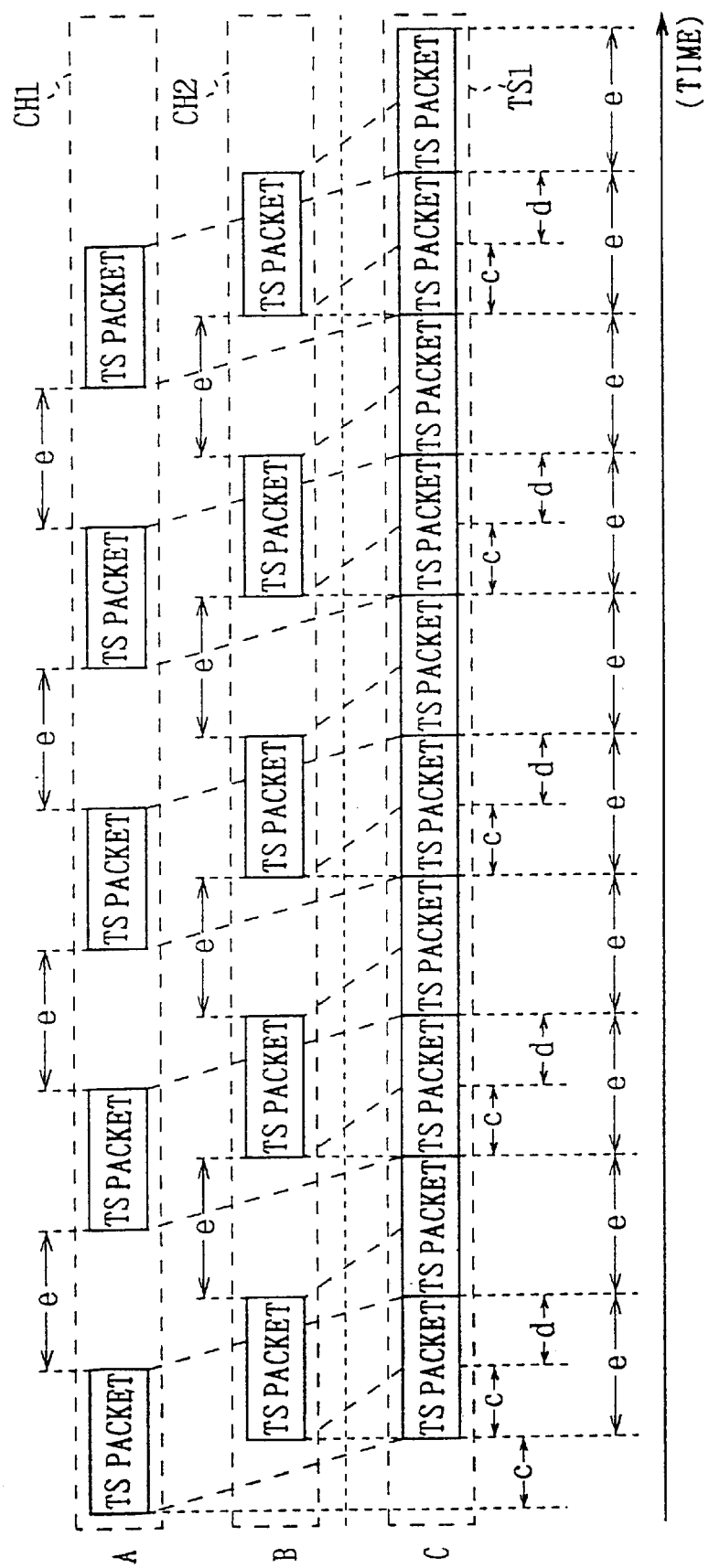
FIG. 18 is a timing chart explaining the multiplexing processing.
Figure 19:
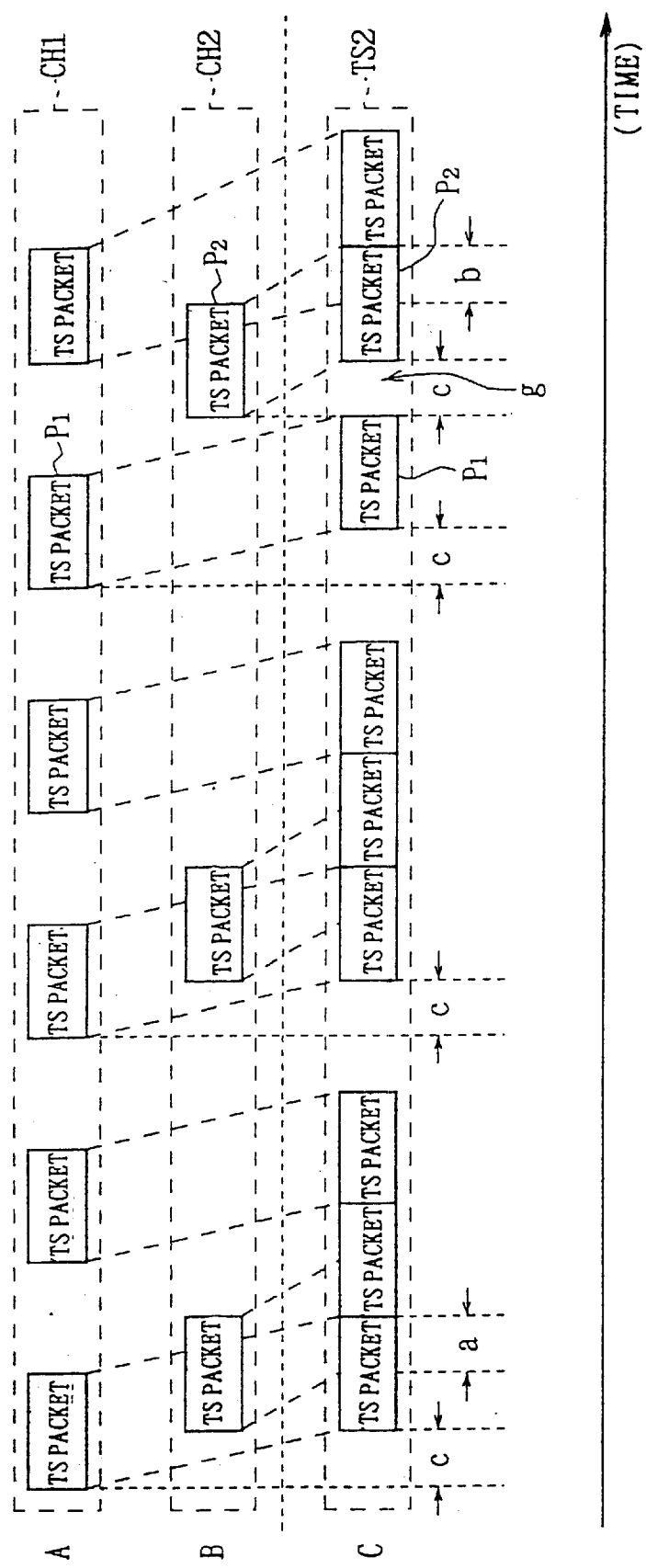
FIG. 19 is a timing chart explaining density between TS packets in the multiplexing processing.

Here, in FIG. 14 in which the same reference numerals are applied to parts corresponding to FIG. 6, the multiplexer 51 have almost the same structure as the multiplexer 19 shown in FIG. 6, except that a program entry unit 55 which makes the transport stream DT4 enter it is provided and the structure of a multiplexing unit 56 differs.

In the case of multiplexing the PSI data-DP1 and the TS packets D1A to D1D supplied from the controller unit 16 and the encoders 15A to 15D respectively and the transport stream DT4, in the multiplexer 51 supplies the PSI data DP1, the TS packets D1A to D1D and the transport stream DT4 to respectively corresponding synchronization byte eliminating units 25A to 25E and 58.

The synchronization byte eliminating units 25A to 25E and 58 have the same structure, in which the synchronization byte of 1 [byte] is eliminated from the header part of each of TS packets forming the PSI data DP1, the TS packets D1A to D1D and the transport stream DT4 supplied and then, these PSI data DP2 and the TS packets D2A to D2D are supplied to the respectively corresponding count value detecting units 26A to 26E and the transport stream DT5 is transmitted to the program entry unit 55.

The PCR counter 28 receives the operational clock CLK1 of 27 [MHz] from the system clock generator 29, counts in synchronization with this, and supplies the count value to the count value detecting unit 26A to 26E and 30 as the count value data D10.

Further, the count value detecting units 26A to 26E, receiving the PSI data DP2 and the TS packets D2A to D2D respectively, sequentially identify the tails of the PSI data DP2 and the TS packets D2A to D2D respectively, and detect the count value of the time when the tail arrives, from the count value data D10 transmitted from the PCR counter 28, to add this value to each tail as the first time stamp (start time of multiplexing processing).

In this way, the count value detecting units 26A to 26E supply the PSI data DP2 and the TS packets D2A to D2D each having the first time stamp added thereto to the FIFO memories 31A to 31E in succession, and the FIFO memories 31A to 31E sequentially store the input PSI data DP2 and TS packets D2A to D2D therein in an arrival order.

On the other hand, a switch 59 of the program entry unit 55 is switch-controlled based on the control signal S5 supplied from the controller unit 16 (FIG. 13). Thus, TS packets D10A for a desired program data are sequentially extracted from the transport stream DT5 input to the switch and are transmitted to an input terminal of a switch 60 of a next stage.

The switch 60 selectively switches its connection to a PSI data correcting unit 61 or a count value detecting unit 62 according to the PID channel of each input TS packet, to divide each TS packet D10A into the PSI data DP10 having the PSI and the TS packet D10B having the video data and the audio data.

The PSI data correcting unit 61, receiving the PSI data DP10 and the PSI data DP2 obtained by the count value detecting unit 26A, synthesizes the PSI data DP2 and the PSI data DP10 based on the control signal S5 with reference to the first time stamp added to the PSI data DP2.

In this case, since the transport stream DT5 is a sequence of packets that have already been multiplexed by another station, the PSI data DP2 and the PSI data DP10 differ in the content of PSI. Therefore, it is necessary to correct so as not to overlap the program numbers in the program association table PAT out of each PSI at the time of multiplexing the PSI data DP2 and the PSI data DP10.

Specifically, as shown in FIG. 15, in the case where the transport stream DT5 is taken as a stream in which the TS packets corresponding to program data for channels ChA and ChB are multiplexed, it is assumed that the program number for the channels ChA and ChB before performing the correction are "00×0001" and "00×0002" respectively. In this case, with respect to the TS packets corresponding to program data for the channels 1 to 4, if it is assumed that the program numbers on the PAT are "00×0001", "00×0002", "00×0003", and "00×0004", the program numbers corresponding to the channels ChA and ChB on the PAT are newly reassigned so as to prevent overlap because the program numbers corresponding to the channels ChA and ChB on the PAT are the same as those corresponding to the channels Ch1 and Ch2.

Thus, the PSI data correcting unit 61, with respect to the PSI data DP2 and PSI data DP10 synchronized, reassigns the program numbers of the PSI data DP10 which are the same as those of the PSI data DP2 on the PAT, to new different program numbers and then transmits this to the FIFO 31A as PSI data DP15.

Further, the count value detecting unit 62, receiving the TS packets D10B, sequentially identifies the tails of the TS packets D10B, and detects the count value of the time when the tail arrives, from the count value data D10 output from the PCR counter 28, to add this to the tail as the first time stamp (start time of multiplexing processing) and then, transmits this to an input rate measuring unit 63 as a TS packet D10C.

The input rate measuring unit 63 measures the transmission capacity of the TS packet D10C by counting the number of packets (one packet is 188 [byte]) which pass in a unit of time, in synchronization with the control signal S5 with respect to the input TS packet D10C. After that, the input rate measuring unit 63 stores the TS packet D10C having the first time stamp added thereto, in the FIFO memory 64.

The FIFO memories 31A to 31E and 64 are connected to the input terminal of the switch 65, and are selectively switched based on the control signal S5 output from the controller unit 16 so as to perform reading in a storing order for each channel.

Thus, the multiplexing unit 56 reads out and multiplexed the PSI data DP2, DP15, and the TS packets D2A to D2D and D10C in the order of storing in the plural FIFO memories 31A to 31E and 64, to form a transport stream DT7, and supplies this to a PID changing unit 66.

In the case where the PID values assigned to the TS packet D10C and the PSI data DP15 of the transport stream DT7 are the same as those assigned to other TS packets D2A to D2D, the PID changing unit 66 changes the PID values assigned to the TS packet D10C and the PSI data DP15 to other different PID values based on the control signal S5.

At this time, since the TS packet D10C and the PSI data DP15 of the transport stream DT7 are sequences of packets which have already been multiplexed by another station, other TS packets D2A to D2D and they differ in the PID values assigned to the video data and the audio data. Therefore, it is necessary to perform the correction so that the PID values are not overlapped in the packets after performing the multiplexing processing.

Specifically, as shown in FIG. 16, in the case where streams in which the TS packets corresponding to the program data for the channels ChA and ChB are multiplexed are the TS packet D10C and the PSI data DP15, it is assumed that the PID values of the video data and the audio data for the then channels ChA and ChB are "0x0100" to "0x0103". In this case, if the PID values of the video data and the audio data with respect to the TS packets D2A to D2D corresponding to the program data for the channels Ch1 to Ch4 are set to "0x0100" to "0x0107", the PID values corresponding to the channels ChA and ChB are the same as those corresponding to the channels Ch1 and Ch2. Therefore, the PID values corresponding to the channels ChA and ChB are newly reassigned so as to avoid the overlap.

Thus, the PID changing unit 66 reassigns the overlapped PID values of the TS packets D2A to D2D, D10C and the PSI data DP15 in the transport stream DT7 to different values, and then transmits this to the count value detecting unit as a transport stream DT8.

In this case, firstly the count value detecting unit 30 detects the first time stamp added by each count value detecting unit 26A to 26E and 62 from the supplied transport stream DT8 and moreover, detects the count value of the time when the first time stamp arrives, from the count value data D10 obtained by the PCR counter 28, as the second time stamp. After that, the count value detecting unit 30 supplies the count values shown by the first and second time stamps to the PCR value correcting unit 34.

Similarly to the aforementioned first embodiment, the PCR correcting unit 34 corrects the PCR value added to each of TS packets forming the transport stream DT8 and then, eliminates the PCR from the transport stream DT8, and supplies this to the synchronization byte adding unit 35 as a transport stream DT9.

The synchronization byte adding unit 35 sequentially adds the original synchronization byte which is eliminated by each synchronization byte eliminating unit 25A to 25E and 58 described above, to each of the TS packets-forming the transport stream DT9, to form a transport stream DT10 having a stream interval of 2 [byte].

Thus, the multiplexing unit 56 transmits the transport stream DT10 supplied from the synchronization byte adding unit 35 via a transmitter (not shown) of a next stage as a digital broadcast signal S15.

(3-2) Operation and Effect of Second Embodiment

In the aforementioned configuration, in the multiplexer 51 of the transmitter 50, the synchronization data of 1 [byte] is eliminated from the header part of each of the TS packets D1A to D1D output from the encoders 15A to 15D and after that, these TS packets D2A to D2D are transmitted to the count value detecting units 26B to 26E.

Further, the synchronization data of 1 [byte] is eliminated from the header part of each of the TS packets which form the transport stream DT4 which has already been multiplexed by another station and then, in the program entry unit 55, the TS packet D10 of the obtained transport stream DT5 is transmitted to the count value detecting unit 62. In addition to this, the program entry unit 55 corrects the format of the PSI data DP10 (program numbers on the PAT) serving as the program specific information, in the transport stream DT5, so as to secure adjustment with the PSI data DP2 serving as the program specific information which is common in all channels of the apparatus. Sequentially, the count value detecting units 26B to 26E and 62 add the PCR (first time stamp) of 3 [byte] which is synchronized with the count result by the PCR counter 28 to the respectively corresponding TS packets D2A to D2D, D10B and then, the multiplexing unit 56 executes the multiplexing processing in the input order to form the transport stream DT7.

The multiplexing unit 56 corrects the format (PID value) of the TS packet D10C of the transport stream DT7 and thereby, the adjustment with the TS packets D2A to D2D that are common in all channels of the apparatus can be secured. Then, the multiplexing unit 56 corrects the PCR value subjected to the multiplexing processing, using the first time stamp added before performing the multiplexing processing in the transport stream DT7, to keep the delay time due to the statistics multiplexing processing constant irrespective of the variation of the input rate for each channel.

Then, the multiplexing unit 56 eliminates the PCR from the transport stream DT9 having the corrected PCR, and sequentially adds the original synchronization byte of 2 [byte] mentioned above, to form the transport stream DT10 having a stream interval of 2 [byte].

As a result, in the multiplexer 51 of the transmitter 50, even the case where the transmission rate for the TS packet in performing the multiplexing processing is varied, the PCR value previously added to each TS packet can be corrected based on the first time stamp added to each TS packet multiplexed.

In addition to this, in the case of setting a new channel, the transport stream DT4 multiplexed with another format is adjusted to the system format of the apparatus by the multiplexer 51, without providing an encoder in the transmitter 50, so that the transmitter 50 capable of increasing the number of channels can be realized with a simple structure. According to the aforementioned configuration, in the multiplexer 51 of the transmitter 50, the first time stamp is added to each TS packet at a former stage of the multiplexing processing in place of the synchronization byte, the PCR value previously added to each TS packet subjected to the multiplexing processing is corrected by using the first time stamp and then, the synchronization byte is added again in place of the first time stamp. Thereby, even the case where the transmission rate of the TS packet in performing the multiplexing processing is varied, the PCR value previously added to each TS packet can be corrected based on the first time stamp added to each TS packet multiplexed, thus making it possible to realize the multiplexer 51 capable of significantly improving the transmission efficiency for packetized data.

(4) Other Embodiments

Note that, in the aforementioned embodiment, it has dealt with the case where the synchronization byte eliminating units 25A to 25E are applied as a data eliminating means for eliminating a synchronization byte serving as redundant data from each packet. The present invention, however, is not limited thereto and a data eliminating means having another configuration can be applied as long as redundant data can be sequentially eliminated from the packets supplied.

Further, in the aforementioned embodiment, it has dealt with the case the counter value detecting units 26A to 26E are applied as a time information adding means for adding a time stamp serving as absolute time information to each packet from which the redundant data is eliminated. The present invention, however, is not limited thereto and a time information adding means having another configuration can be applied as long as a time stamp can be added to each of packets obtained by the data eliminating means 25A to 25E.

Further, in the aforementioned embodiment, it has dealt with the case where the multiplexing units 27 and 56 are applied as a packet sequence forming means for forming a sequence of packets based on each of the packets sequentially supplied and then for correcting the time information (PCR) previously added to each corresponding packet based on the absolute time information (first time stamp) added to each packet. However, the present invention is not limited thereto and a packet sequence forming means having another configuration can be applied as long as time information added to each packet can be corrected based on absolute time information added to each packet irrespective of the variation of the transmission rate for each packet.

Further, in the aforementioned embodiment, it has dealt with the case where the count detecting units 26A to 26E are applied as a first count means for counting the absolute time based on the absolute time information (first time stamp) and the count value detecting unit 30 is applied as a second count means for counting the absolute time by loading the count value of each of the count value detecting units 26A to 26E, with respect to the packet sequence forming means 27, 56. The present invention, however, is not limited thereto and first and second count means having another configuration can be applied as long as time information can be corrected in the case where the count value of the second count means is the same as the time based on time information (PCR) previously added to corresponding packet.

Further, in the aforementioned embodiment, the PCR correcting unit 34 is applied as a time information eliminating means for eliminating the absolute time information (first time stamp) from each packet in which the time information is corrected by the packet sequence forming means 27 and 56. The present invention, however, is not limited thereto and a time information eliminating means having another configuration can be applied as long as absolute time information can be eliminated from each packet.

Further, in the aforementioned embodiment, the synchronization byte adding unit 35 is applied as a data adding means for adding the redundant data (synchronization data) to each packet from which the absolute time information (first time stamp) is eliminated by the time information eliminating means 34. The present invention, however, is not limited thereto and a data adding means having another configuration can be applied as long as original redundant data can be added to each packet.

Furthermore, in the aforementioned embodiment, the present invention is applied to the multiplexers 19 and 51 used in the transmitters 11 and 50 of the digital video broadcast system 10. The present invention, however, is not limited thereto and can be widely applied to other kinds of data processing apparatuses to which the MPEG2 is applied.

INDUSTRIAL APPLICABILITY

In the receiver of the digital video broadcast system, the present invention can be utilized for the case of transmitting packetized data.

What is claimed is:

1. A data processing apparatus for adding redundant data to supplied data every predetermined unit and packetizing them, and for outputting said data packetized in said predetermined unit as a sequence of packets, comprising:

data eliminating means for eliminating said redundant data from each of said packets;

time information adding means for adding a time stamp to each of said packets from which said redundant data is eliminated;

packet sequence forming means for forming said sequence of packets based on said packets sequentially supplied and then, for correcting, based on said time stamp previously added to each of said packets, a program clock reference previously added to said corresponding packet;

time information eliminating means for eliminating said tme stamp from each of said packets having said program clock reference corrected; and data adding means for adding said redundant data to each of said packets from which said time stamp is eliminated.

2. The data processing apparatus according to claim 1, wherein:

said packet sequence forming means comprising first count means for counting a system clock based on said each time stamp, and second count means for loading said count value of said first count means to count said system clock; and when a count value of said second count means matches to the time based on said program clock reference previously added to said corresponding packet, said program clock reference is corrected.

3. The data processing apparatus according to claim 1, wherein said time stamp is formed by at least 3 [byte].

4. The data processing apparatus according to claim 1 wherein said packet sequence forming means comprising storage means for storing said packets sequentially supplied in the supplying order and reading means for reading said packets stored in said storage means, in the storing order.

5. The data processing apparatus according to claim 4, wherein:

said packet sequence forming means comprising null packet generating means for generating a null packet for dummy formed in the same format as each of said packets stored in said storage means; and said reading means, when said storage means storing said packets is empty, switches the connection to said null packet generating means from said storage means to have said null packet transmitted.

6. The data processing apparatus according to claim 4, wherein in the case where other packets having program specific information different from each of said packets stored in said storage means, said packet sequence forming means assigns, so as not to overlap with a program number assigned to each of said packets stored in said storage means, on the program association table, a program number different from the program number to each of said other packets.

7. A data processing method of adding redundant data to supplied data every predetermined unit and packetizing them, and of outputting said data packetized in said predetermined unit as a sequence of packets, comprising:

a first step of eliminating said redundant data from each of said packets;

a second step of adding a time stamp to each of said packets from which said redundant data is eliminated;

a third step of forming said sequence of packets based on said packets sequentially supplied and then, of correcting, based on said time stamp previously added to each of said packets, a program clock reference previously added to said corresponding packet;

a forth step of eliminating said time stamp from each of said packets having said program clock reference corrected; and a fifth step of adding said redundant data to each of said packets from which said time stamp is eliminated.

8. The data processing method according to claim 7, wherein:

said third step wherein:

a system clock based on said each time stamp is counted with a first count means and then, the count value is loaded and said system clock is counted with a second count means; and when said count value of said second count means matches to a time based on a program clock reference previously added to said corresponding packet, said program clock reference is corrected.

9. The data processing method according to claim 7, wherein said time stamp is formed by at least 3 [byte].

10. The data processing method according to claim 7, wherein said third step stores said packets sequentially supplied in the supplying order and reads said packets stored in said storage means, in the storing order.

11. The data processing method according to claim 10, wherein:

said third step wherein:

a null packet for dummy formed in the same format as each of said packets stored is generated; and when there is no stored packet, said null packet is transmitted.

12. The data processing method according to claim 10, wherein in the case where other packets having program specific information different from each of said packets stored are plied, said third step, so as not to overlap with a program number assigned to each of said packets stored, on the program association table, assigns a program number different from the ram number to each of said other packets.

* * * * *